United States Patent [19]

Levinson

[11] 4,390,554

[45] Jun. 28, 1983

[54] MICROWAVE HEATING OF CERTAIN FROZEN FOODS

[76] Inventor: Melvin L. Levinson, 1 Meinzer St., Avenel, N.J. 07001

[21] Appl. No.: 129,360

[22] Filed: Mar. 11, 1980

Related U.S. Application Data

[63] Continuation-in-part of Ser. No. 927,397, Jul. 24, 1978, abandoned, which is a continuation-in-part of Ser. No. 713,235, Aug. 6, 1976, Pat. No. 4,103,431, which is a continuation-in-part of Ser. No. 572,385, Apr. 28, 1975, abandoned.

[51] Int. Cl.$^3$ .................. A23L 1/00; B65B 29/08; B65B 29/00

[52] U.S. Cl. .................. 426/232; 206/204; 206/205; 219/10.55 E; 219/10.55 M; 229/87 F; 426/107; 426/113; 426/124; 426/234; 426/393; 426/412

[58] Field of Search ............ 426/113, 114, 107, 234, 426/415, 412, 124, 126, 127, 243, 241, 242, 232, 393; 219/10.55 E, 10.55 M, 10.55 R; 206/204, 205; 229/87 F

[56] References Cited

U.S. PATENT DOCUMENTS

| | | | |
|---|---|---|---|
| 1,436,754 | 11/1922 | Chadwick | 426/122 |
| 2,480,679 | 8/1949 | Spencer | 426/234 |
| 2,633,284 | 3/1953 | Moffett et al. | 426/113 |
| 2,674,536 | 4/1954 | Fisher | 426/114 |
| 3,188,215 | 6/1965 | Snow | 426/114 |
| 3,209,978 | 10/1965 | Dupuis | 426/127 |
| 3,256,101 | 6/1966 | Aws | 426/241 |
| 3,322,319 | 5/1967 | Sweeney et al. | 426/113 |
| 3,410,697 | 11/1968 | Stephenson | 426/114 |
| 3,411,433 | 11/1968 | Christopher | 426/113 |
| 3,415,662 | 12/1968 | Koger et al. | 426/113 |
| 3,889,009 | 6/1975 | Lipoma | 426/234 |
| 3,985,990 | 10/1976 | Levinson | 426/243 |
| 3,985,991 | 10/1976 | Levinson | 426/243 |
| 4,013,798 | 3/1977 | Goltsos | 426/114 |
| 4,015,085 | 3/1977 | Woods | 426/107 |
| 4,027,132 | 5/1977 | Levinson | 426/243 |
| 4,132,811 | 1/1979 | Standing et al. | 426/113 |

FOREIGN PATENT DOCUMENTS 479968 1/1952 Canada .................. 426/114

*Primary Examiner*—Steven L. Weinstein

[57] ABSTRACT

Certain frozen foods, as deep fat fried foods and baked and leavened products, are, during a microwave exposure, buffered against microwave edge and spot heating by enclosing said food within a microwave-permeable, vapor-resistant, heat-resistant enclosure which can employ a vapor release means. Where, within said enclosure and around said food, a microwave-permeable, transparent-to-liquid-and-oil-under-pressure, plastic film is enclosed in a water-and-oil-absorptive, microwave-permeable material and where the defrosting, heating and subsequent cooling can be temperature monitored, where the results can be varied by using water and salt water and where baked and leavened products useful life can be extended by the timely application of water.

17 Claims, 2 Drawing Figures

MICROWAVE HEATING OF CERTAIN FROZEN FOODS

CROSS REFERENCE TO RELATED APPLICATIONS

This application is a continuation-in-part application of Ser. No. 927,397, filed July 24, 1978, now abandoned which application is a continuation-in-part application of Ser. No. 713,235, filed Aug. 10, 1976, now U.S. Pat. No. 4,103,431, which application was a continuation-in-part application of Ser. No. 572,385, filed Apr. 28, 1975, now abandoned.

BACKGROUND OF THE INVENTION

1. Field of the Invention

Methods and apparatus for defrosting and heating certain frozen convenience foods (for example, fried egg rolls, fried chicken, fried sandwiches, hot corn beef sandwiches and baked and leavened products) in a microwave oven are described. This invention concerns the reconstituting of certain frozen, precooked foods, in a microwave oven, without using metal members, as exemplified by my U.S. Pat. Nos. 3,985,990 and 3,985,991, or microwave auxiliary heating elements, as exemplified in my U.S. Pat. No. 3,777,099, but capitalizing on some of the principles of heat transfer and microwave cooking taught in said patents.

2. Description of Prior Art

Frozen food, reconstituted in a microwave oven, tends to spot heat. This is attributed to the different loss factors of frozen vs. unfrozen portions of the same food. Moreover, flat portions of food, as a sandwich, tend to edge heat—for unlike the middle portion of a sandwich which can only receive microwave energy from its top and bottom, the edge of said sandwich receives its energy from its top, bottom and side. To overcome spot, selective and edge heating, it is taught to operate at reduced power levels and/or provide a resting interval, but reduced power levels and resting intervals undesirably increase the cooking time and can result in undesirable dehydration of a food.

In microwave cooking, microwave energy concentrates at the ends of cylindrical foods (as egg rolls and hot dogs) and foods with protuberances (as the ends of fried chicken wings) which results in uneven, undesirable heating. Prior art teaches to cover ends, edges and protuberances with aluminum foil shielding to combat this problem. In my U.S. Pat. No. 3,985,990, there is taught to perforate said aluminum foil shielding to permit the free release of water and oil food by-products while shielding said ends, edges and protuberances. This invention differentiates over my perforated aluminum foil shielding in that it accomplishes, in one operation, all the required shielding of said ends, edges and protuberances by overlaying a food with a novel structure which includes perforated, plastic film and a padding of microwave-permeable, liquid-absorptive material. Said padding of microwave-permeable, liquid absorptive material, in permitting the free random irradiation of a food by microwave energy, results in water being ejected from initially heated spot and edge portions of said food. Which ejected water is forced through a porous plastic film into a liquid-absorptive material. Whereupon the wet liquid-absorptive material becomes microwave-absorptive which thereupon selectively reduces the amount of microwave energy reaching the areas of food which initially evolved said water.

This and further advantages of my discovery will become more apparent in the description that will follow.

The words "egg rolls" in this writing is meant to describe a cylindrical type, crusted, deep fat fried food whose filling may be of many varieties. For example, some fried "egg roll"]type products may contain pizza type fillings and others may contain white and/or dark meat, boneless chicken. When fried, packaged in my novel package and frozen, said deep fat fried, boneless chicken rolls, pizza rolls, Chinese egg rolls and the like will result in a desirable snack food product line for vending operations. Notwithstanding this special deep fat fried, batter crusted, boneless chicken "egg roll" snack product, the words "fried chicken" and "fried foods" used herein encompass their common connotation.

This invention is a continuation-in-part of my U.S. Ser. No. 927,397, filed July 24, 1978 now abandoned which is a continuation-in-part of my U.S. Pat. No. 4,103,431 where is described drying methods and apparatus for drying articles. In said Ser. No. 927,397 and U.S. Pat. No. 4,103,431 are taught, during microwave heating, to extend the physical size of an article by temporarily confining it within a microwave-permeable container which impedes the free release of vapor from said article so that said article will dry in a positive vapor of its own making. In said Ser. No. 927,397 now abandoned and U.S. Pat. No. 4,103,431, there are discussed the advantages of temperature monitoring of vapor pressure overlaying an article, wrapping an article in perforated high-temperature plastic film and employing a liquid-absorptive enclosure. This invention draws on the discoveries I made in said U.S. Pat. No. 4,103,431. This invention does not concern the uniform drying of my U.S. Pat. No. 4,103,431 or the selective heating of my U.S. Pat. Nos. 3,985,990 and 3,985,991, but concerns novel structure designed to defrost and heat certain foods which novel structure is also useful during shipping, storing, serving and/or eating of said foods.

In commercial and vending feeding, the faster an item can be heated, the longer it can be held hot, the convenience and simplification added by the package (for example, no requirement for knife and fork) and the ease of clean up are all important considerations which this invention is designed to afford.

SUMMARY OF THE INVENTION

Described is a food package whose structure is employed to contact and timely buffer, from direct exposure to microwave radiation, the outer periphery of certain food while said certain food is defrosted and heated in a microwave oven. It is expected that, at the termination of microwave heating, said food package will be spot, selective and edge heated rather than, without said food package, said food undesirably spot, selectively and edge heating. The part of said food package in direct contact with said food is fabricated of high-temperature-resistant material to permit said food's surface to reach browning and crusting temperatures. Means are provided in said high-temperature material so that liquid by-products, forced out of said food, can pass freely across said high-temperature material and thereupon lodge in liquid absorptive material.

It is an object of this invention to describe a microwave oven heating package which can be employed during shipping, storing, serving and/or eating of certain foods.

It is an object of this invention to describe a microwave heating package for reconstituting prefried, frozen convenience foods.

It is an object of this invention to describe methods and apparatus for reconstituting in a microwave oven deep fat fried frozen chicken, Chinese and other type "egg rolls" and sandwiches.

It is an object of this invention to describe methods and apparatus for reconstituting in a microwave oven baked and leavened products.

DESCRIPTION OF THE PREFERRED EMBODIMENTS

Figure 1:
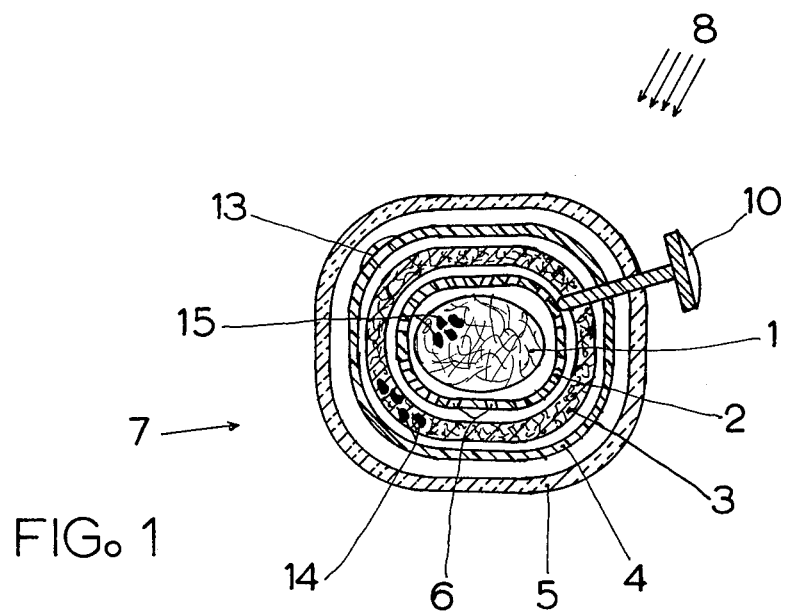
FIG. 1 is an exploded cross-section diagram of the food package of this invention.

The foods referred to, herein, are foods which are by their nature will be contained by a microwave-permeable, perforated plastic film. FIG. 1 is an exploded, cross-section diagram showing the construction of food package 7 for reconstituting therein a frozen convenience food 1 in a microwave oven. Food 1 is enclosed in and contacted by a peforated plastic film 2 which in turn is enclosed in a microwave-permeable, water and food by-product absorptive material 3 where all is enclosed by a microwave-permeable, liquid-barrier plastic film 4 and, finally, all of which is enclosed by a microwave-permeable, heat-insulating material 5.

It is preferred to use a high-temperature plastic film 2 (as the Nylon and polyester plastic films in common use for gas and electric oven browning bags which operate at oven temperatures circa 350° F.) which has been made water and oil permeable by perforating a multitude of holes 6 therethrough. Holes 6 must be of such size as to permit film 2 to contain food 1 therein and of such number as to afford the free, random passage of water and oil through film 2 when said water and oil is in motion due to the exposure of food 1 to microwave radiation 8. The size of holes 6 taken with the thickness of plastic film 2 must not permit food 1 to sag through holes 6 in plastic film 2 and physically touch absorptive material 3. Holes 6 must not be of such small dimension as to support the capillary transfer of liquid through film 2.

Microwave-permeable, heat-insulating member 5 can be constructed of paper, cardboard or other material of low thermal conductivity—material useful for a hot pot holder. Microwave-permeable, liquid-absorptive material 3 is best constructed of blotting type paper or natural (as cotton) or synthetic (as plastic) fibres.

In operation (as seen in FIG'S 1 and 2) frozen food package 7 with food 1 therein is exposed to microwave radiation 8 whereupon steam (steam initially generated by spot, selective and edge heating of crust 16 and filling 17 portions of food 1) contained by plastic film 4 blankets and so defrosts the complete crust 16 of food 1. And while this is happening a second steam source starting deep in filling 17 of food 1 (e.g. core heating) drives before it, out of food 1, food by-products as said second steam source forces its way through the body of food 1 to and through crust 16 (core heating is additionally discussed in my U.S. Pat. No. 4,103,431). Said head of steam of said second steam source forces water, oil and other food by-products, that pass through crust 1, through perforations 6 in perforated plastic film 2 whereupon said by-products are absorbed in microwave-permeable, absorptive-material 3. When the heating process is terminated and the microwave generator is turned off, said water, oil and food by-products, absorbed in absorptive-material 3, cannot transfer back to hot food 1 lacking a motive source. Trying to wet the crust 16 of food 1 are the wet portions of filling 17 and vapors emitting from the moisture caught in absorptive-material 3. Initially they cannot wet the crust 16 because crust 16, initially low in moisture and denser than filling 17, reaches baking temperatures. Crust 16 is an initial generator of water vapor (e.g. steam) when food package 7 is exposed to microwave radiation 8. Then, because of crust 16's low mass and density, crust 16 quickly dries and continued exposure to microwave radiation heats crust 16 to the highest temperature in heated food package 7. Water vapor can only condense on cool elements. Crust 16 once heated cools slowly for being dry it can not cool by evaporating water. Moreover, because saturated hot water vapor fills food package 7, held therein by liquid-barrier, plastic film 4, heat cannot easily transfer out of food 1 by conduction, convection, radiation or the evaporation and condensation of water. This action tends to make food 1 taste better for a longer time even though package 7 is not promptly opened.

Outer plastic film 4 is designed to contain a positive vapor pressure within food package 7 up to a preselected vapor pressure whereupon film 4 is best designed to rend and thereby vent steam above a preselected temperature and pressure. For example, in well known manner, outer plastic film 4 can be constructed of high-temperature, plastic film (e.g. nylon and polyester films) and designed to vent a a preselected temperature by blow out plugs 13 or can be constructed of a low temperature plastic (as polyethylene) formulated to melt at a predetermined temperature. Microwave-permeable, heat-insulating outer material 5 is optional and can be employed for such service as: (a) an aid in uniform internal heating, (b) heat-insulating package 7 from contact with cool oven surface and (c) as an aid in the easy handling of heated food package 7.

The time it takes to heat individual portions of food and the time it takes for said food to cool subsequent said heating is important in commercial feeding. While my food package is directed to commercial food applications, as vending, it is useful for domestic defrosting and heating. Food package 7 lowers the time it takes to defrost and heat and raises the time it takes a given product to cool subsequent heating.

In operation, food package 7 defines over heating food in the prior art apparatus and methods set forth and exemplified by my U.S. Pat. Nos. 3,985,990 and 3,985,991 because in food package 7 the microwave-lossy-liquid component (as water) is not trapped in a microwave-shielded collection chamber or trapped from recycling by proximetry to microwave-reflective material. In food package 7, by-product water and steam condensed to water are dispersed in liquid-absorptive material. By so dispersing water, there is created a bigger target area which captures more microwave radiation 8 and thereby hastens the evaporation or reevaporation of said water. Steam, per se, and fat are both relatively microwave non-lossy. Hence, fat is trapped and remains in liquid-absorptive material 3, and the steam, which fills the chamber defined by film 4, acts with material 3 and film 4 to create a blanket surrounding and heat-insulating food 1.

An advantage of food package 7 is that a portion of the oil on the surface of a fried food (for example, egg rolls, fried chicken, fried Monte Cristo sandwiches) cooked in food package 7 is forced through perforated plastic film 2 where it is trapped out of contact with food 1. The water and oil trapped in absorptive material 3 is blocked from contact with food 1 by the thickness of plastic film 2. The result is less oily, greasy cooked food which is desired by many. Because of perforated plastic film 2, when heated, food 1 is not left resting in a pool of grease and oil which would be undesirable to many. Said another way, fried food, heated in food package 7, is blotted of oil and does not require the subsequent draining and blotting characteristic of deep fat frying in gas and electric cooking. Notwithstanding the obvious advantage food package 1 has in reconstituting fried foods and other foods singled out herein, it is expected that many will find food package 1 highly useful in reconstituting numerous other type foods as a corn beef sandwich.

When desired, advantageously, a small amount of water or salt water 14 can be arbitrarily added to liquid-absorptive material 3 anytime before exposing food package 7 to microwave radiation 8. Water or salt water is dispersed by capillary action through liquid-absorptive material 3 and makes said material 3, generally, initially more microwave-absorptive than food 1. Hence, in heating up food package 7, initially, much of the power of microwave radiation 8 is expended in said small charge of salt water 14. Salt water 14 swiftly boils and its hot vapors blanch and completely defrost the surface of food 1. This action counters microwave spot heating and thermal run away effects that may occur without said salt water 14 charge. Employing salt water 14 as described permits faster heating through higher power operation where faster heating is the result sought. When salt water 14 is employed as described, it should be noted that perforated plastic film 2 takes on the additional function of not allowing salt water 14 to impinge upon food 1 thereby changing food 1's flavor.

The speed at which bread and rolls dry out after being heated in a microwave oven has long been considered as a shortcoming of microwave ovens. A method that I discovered to obviate said shortcoming is to add extra-water 15 in the form of a water spray on a slice of bread or water injected into a roll. Small amounts of extra-water 15 can be added to risen baked goods before freezing at which time it is dispersed within the bread product by capillary action. Whereupon, after subsequent microwave defrosting and heating, said bread, roll or other baked and leavened product will not dry out as quickly as if the baked and leavened food was defrosted and heated in a microwave oven without said extra water 15 and/or food package 7. Surprisingly, adding extra-water 15 to stale bread has made said stale bread taste fresh when reconstituted. One must learn to choose the right amount of extra-water 15 to make the resultant defrosted and heated roll remain moist and taste as well as a freshly baked roll. It is preferable to allow a charge of extra-water 15 time to disperse within a baked and leavened product before freezing. Ice is relatively non-lossy and, if said extra-water 15 is not allowed to disperse before freezing, after exposure to microwaves said quickly wetted and frozen baked and leavened product could be steaming hot with a small ice cube or puddle of water selectively placed within, an unsatisfactory condition.

There are innumerable type and size portions of the same type of food, different freezer temperatures, different microwave oven power levels and ambient conditions all which have a part in determining how long it will take to defrost and heat a given food in a given situation. For a particular situation, one must learn empirically how much water to add if any, the amount of absorptive material to use, etc. I have discovered that once the time per ounce of food is discovered for a given freezer, package and microwave oven, this time per ounce holds well for other types of food and for different amounts of the same food. I have discovered that a thermometer (microwave oven type) inserted into food package 7, during its exposure to microwave radiation, to monitor the vapor temperature of the heating chamber, defined by outer plastic film 4, will indicate the average of many variables (e.g. a thermometer will report a colder freezer and a more powerful oven equal to a warmer freezer and a less powerful oven). Depending on the filling of a sandwich, one can defrost and heat a food package up to 120° F., or 190° F., or 220° F., etc. during a microwave exposure and then continue to monitor the temperature of unopened food package 7 until its temperature drops to a preselected temperature, for example, room temperature, 140° F., or 170° F., etc. for repeatable results. Using thermometer 10 for denser portions of food, as fried chicken, one can defrost the chicken and heat it to 212° F., boiling temperature, and continue heating until the temperature stops holding at 212° F. and raises to 220° F. whereupon microwave radiation 8 is turned off and the food package 7 opened when its temperature falls to 180° F. Using such programs as illustrated, thermometer 10 is useful to familiarize the uninitiated with the operation of food package 7 and is useful initially with each new type food defrosted and heated. Once the defrosting and heating time for a given type egg roll in a given situation is determined (using thermometer 10 or by simple experiment) the continued use of thermometer 10 becomes superfluous as the results become predictable.

Figure 2:
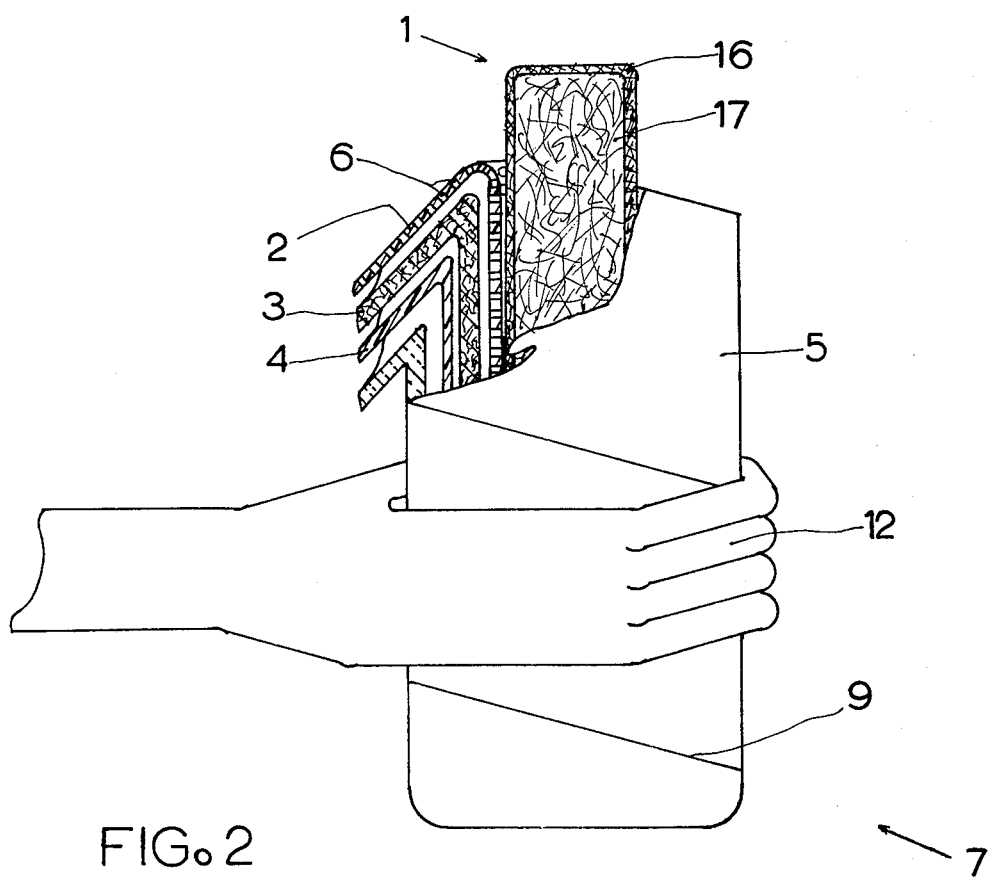
FIG. 2 is one embodiment of this invention, in partial cross-section, showing a hand holding a food package which contains an "egg roll"]type food.

FIG. 2 illustrates one embodiment of the invention showing a hand 12 holding food package 7 where food 1, illustrated in cross-section, is an egg roll with crust 16 and filling 17. After heating, food package 7 can be hand held as illustrated (made practical by the heat insulating properties of heat-insulating material 5). FIG. 2 illustrates food package 7's top opened using an easily ripped seam 9 designed into package 7 to provide "zipper" type means of opening package 7. Plastic film 2's perforations 6 and absorptive material 3's loose fibres are designed to easily tear apart as easily ripped seam 9 is ripped open. In FIG. 2, food package 7 is designed to be progressively torn away as the egg roll, food 1, is progressively consumed. The remains of food package 7, as food 1 is consumed above it, acts to protect the unconsumed portions of food 1 and keep it hot while protecting hand 12 from hot food 1 and the grease and oil by-products released during the heating of food 1.

It is expected that without the exercise of invention one may manufacture food package 7 as one structure with perforated film 2, insulating material 3, outer film 4 and insulating material 5 as layers. Manufacturing all of food package 7 of plastic (e.g. plastic fibres for absorptive material 3 and plastic foam for heat-insulating material 5) the walls of food package 7 could be wrapped around food 1 and heat sealed shut.

Although this invention has been described with a certain degree of particularity, it is understood that the present disclosure has been made only by way of example and that numerous changes in the details and construction and in the combination and arrangement of parts and in the methods described may be resorted to without departing from the spirit and scope of the invention.

I claim:

1. For use in a microwave oven, a food package which comprises:
   a microwave-permeable, non-liquid-absorptive inner member for covering a food,
   a plurality of openings, through said inner member, of sufficient size to permit liquid, food by-products to transfer across said inner member when said liquid, food by-products are in motion due to exposure of said food to microwave radiation and of sufficient size to prevent said transfer of said liquid, food by-products when said liquid, food by-products are not in motion due to exposure of said liquid, food by-products to microwave radiation,
   a microwave-permeable, liquid-absorptive material in contact with, at least, a part of said inner member's outside surface, and
   an outer microwave-permeable, liquid-non-permeable, non-microwave-absorptive enclosure which forms a heating chamber and encloses said inner member and said liquid-absorptive material.

2. A food package, according to claim 1, which includes:
   a charge of a microwave-lossy liquid dispersed in said liquid-absorptive material.

3. In a microwave food package, according to claim 1, which includes:
   where said inner member is a high-temperature plastic film fabricated to operate at a temperature of at least 300° F.

4. For use in a microwave oven, a microwave-permeable package which comprises:
   an inner, microwave-permeable member which encloses an inner heating chamber and which is fabricated to operate at temperatures 212° F. and higher,
   means to permit the release of liquid from said inner chamber during an exposure of said package to microwave radiation and to limit the return to said inner chamber of said liquid subsequent said exposure to said microwave radiation,
   an outer, microwave-permeable member which defines an outer heating chamber which completely encloses said inner heating chamber and is designed to contain vapor, liquid and oil therein, and
   a liquid and oil absorptive material interposed between said inner member and said outer member and which completely encloses said inner heating chamber.

5. In a food package, according to claim 4, which includes:
   a microwave-permeable, heat-insulating material on, at least, part of the outer surface of said outer member.

6. In a food package, according to claim 4, which includes:
   a charge of microwave-lossy liquid dispersed within said outer heating chamber so that, during said exposure to microwave radiation, it is said package that will be initially subject to microwave-spot-and-edge-heating in contrast to said package's contents.

7. In a food package, according to claim 6, which includes:
   where said charge of microwave-lossy liquid is salt water.

8. A method of defrosting and heating, in a microwave oven, a frozen food, the steps which include:
   enclosing said food in an inner, microwave-permeable plastic film which film contains a plurality of openings of sufficient size to permit the passage across said film of liquid-and-oil by-products of said food when under pressure due to exposing said food to microwave-radiation and of sufficient size to limit the passage across said film of said liquid-and-oil when said liquid-and-oil is not under said pressure due to said exposure to microwave radiation,
   completely enclosing said food and said inner film in an outer microwave-permeable container fabricated to contain vapor, water and oil therein,
   placing a water-and-oil-absorptive material between said inner film and said outer container, and
   exposing said food to microwave radiation until said food defrosts and heats.

9. In a method of defrosting and heating, according to claim 8, which includes:
   during said exposure to microwave radiation, venting said outer container at a preselected temperature within said outer container.

10. In a method of defrosting and heating, according to claim 8, which includes:
    monitoring the vapor temperature within said outer container during said exposure to microwave radiation.

11. In a method of defrosting and heating, according to claim 8, which includes:
    placing a heat-insulating, microwave-permeable material outside said outer container prior to said exposure to microwave energy.

12. In a method of defrosting and heating, according to claim 8, which includes:
    adding a microwave-lossy liquid to said water-and-oil-absorptive material before said exposure to microwave energy.

13. In a method of heating a water porous food in a microwave oven, the steps which include:
    dispersing a charge of water in the pores of said food,
    enclosing and contacting said food with an inner, microwave-permeable container so fabricated as to permit the passage of unwanted liquid by-products of said food, when said unwanted liquid by-products are in motion due to an exposure of said food to microwave energy, from the inner food contacting surface of said inner container to the outer surface of said inner container and to impede the transfer of said unwanted liquid by-products from transferring back from said outer surface of said inner container to said inner food contacting surface,
    completely enclosing said food and said inner container in an outer microwave-permeable container so fabricated to contain liquid by-products therein,
    placing a microwave-permeable, liquid-by-product-absorptive member between said inner and outer containers, and subsequently
    exposing said food, so contained, to microwave radiation in said microwave oven.

14. In a method of heating a food, according to claim 13, the added step of:

freezing said food after adding said water and prior said exposure to microwave radiation.

15. In a method of heating a food, according to claim 13, which includes:

employing for said inner container a high-temperature, perforated plastic film fabricated to operate at a temperature of at least 300° F.

16. In a method of reheating, in a microwave oven, certain prepared, crusted foods, the steps which include:

selecting a food from the group consisting of crusted-baked-and-leavened foods, deep-fat-fried fowl, deep-fat-fried pizza rolls, and deep-fat-fried egg rolls, enclosing said selected food in an inner, microwave-permeable, perforated, plastic film, fabricated to operate at a temperature of at least 300° F., so that said film covers and contacts the surface of said selected food, completely enclosing said selected food, in said film, in an outer microwave-permeable container fabricated to contain vapor, water and oil therein, placing a water-and-oil-absorptive material between said inner film and said outer container, and exposing said food to microwave radiation until said food defrosts and heats.

17. In a method of heating, in a microwave oven, according to claim 16, the added step of:

where means are employed so that said inner film, said absorptive material, and said outer member can be easily, progressively torn apart, progressively tearing open said inner film, said absorptive material, and said outer member, after said food is heated, to progressively expose portions of said food as said food is consumed.

* * * * *